(12) United States Patent
Tatsuoka

(10) Patent No.: US 6,522,690 B1
(45) Date of Patent: Feb. 18, 2003

(54) ZERO DETERMINATION SIGNAL GENERATING CIRCUIT

(75) Inventor: Masato Tatsuoka, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/528,997

(22) Filed: Mar. 20, 2000

(30) Foreign Application Priority Data

Mar. 29, 1999 (JP) ............................................ 11-085026

(51) Int. Cl.[7] .............................................. H04B 3/46
(52) U.S. Cl. ...................................................... 375/224
(58) Field of Search .......................... 375/224; 708/320, 708/508; 707/6; 341/55; 710/26; 365/200, 238.5

(56) References Cited

U.S. PATENT DOCUMENTS

| | | | |
|---|---|---|---|
| 3,697,734 A | * 10/1972 | Booth et al. | ................ 708/508 |
| 5,724,572 A | 3/1998 | Dieffenderfer et al. | |
| 5,754,885 A | 5/1998 | Cheong et al. | |
| 6,112,218 A | * 8/2000 | Gandhi et al. | ............... 708/320 |

FOREIGN PATENT DOCUMENTS

EP        0 730 218        9/1996

* cited by examiner

*Primary Examiner*—Don N. Vo
(74) *Attorney, Agent, or Firm*—Arent Fox Kintner Plotkin & Kahn, PLLC

(57) ABSTRACT

A zero determination signal generating circuit which generates a zero determination signal for determining whether or not the output data of a shifter is zero is provided. With the zero determination signal generating circuit of the present invention, high-speed zero determination can be achieved. More specifically, in a case where the shifter functions as a left shifter, as a shifting operation of a left shifter unit (including a plurality of left shifters) is performed, predetermined bits in the outputs of left shifters having a shift amount of 0 are subjected to an OR operation or buffered so as to generate a zero determination signal. In a case where the shifter functions as a right shifter, as a shifting operation of a right shifter unit (including a plurality of right shifters) is performed, predetermined bits in the outputs of right shifters having a shift amount of 0 are subjected to an OR operation or buffered so as to generate a zero determination signal.

3 Claims, 16 Drawing Sheets

FIG.5

| shift amount | SF | /SF | signals ORed by OR/BFcircuit 20 |
|---|---|---|---|
| 0 | 00000 | 11111 | LOR16+LOR8+LOR4+LOR2+LBF+D1[0] |
| 1 | 00001 | 11110 | LOR16+LOR8+LOR4+LOR2    +D1[0] |
| 2 | 00010 | 11101 | LOR16+LOR8+LOR4    +LBF+D1[0] |
| 3 | 00011 | 11100 | LOR16+LOR8+LOR4        +D1[0] |
| 4 | 00100 | 11011 | LOR16+LOR8    +LOR2+LBF+D1[0] |
| 5 | 00101 | 11010 | LOR16+LOR8    +LOR2    +D1[0] |
| 6 | 00110 | 11001 | LOR16+LOR8        +LBF+D1[0] |
| 7 | 00111 | 11000 | LOR16+LOR8            +D1[0] |
| 8 | 01000 | 10111 | LOR16    +LOR4+LOR2+LBF+D1[0] |
| 9 | 01001 | 10110 | LOR16    +LOR4+LOR2    +D1[0] |
| 10 | 01010 | 10101 | LOR16    +LOR4    +LBF+D1[0] |
| 11 | 01011 | 10100 | LOR16    +LOR4        +D1[0] |
| 12 | 01100 | 10011 | LOR16        +LOR2+LBF+D1[0] |
| 13 | 01101 | 10010 | LOR16        +LOR2    +D1[0] |
| 14 | 01110 | 10001 | LOR16            +LBF+D1[0] |
| 15 | 01111 | 10000 | LOR16                +D1[0] |
| 16 | 10000 | 01111 | LOR8+LOR4+LOR2+LBF+D1[0] |
| 17 | 10001 | 01110 | LOR8+LOR4+LOR2    +D1[0] |
| 18 | 10010 | 01101 | LOR8+LOR4    +LBF+D1[0] |
| 19 | 10011 | 01100 | LOR8+LOR4        +D1[0] |
| 20 | 10100 | 01011 | LOR8    +LOR2+LBF+D1[0] |
| 21 | 10101 | 01010 | LOR8    +LOR2    +D1[0] |
| 22 | 10110 | 01001 | LOR8        +LBF+D1[0] |
| 23 | 10111 | 01000 | LOR8            +D1[0] |
| 24 | 11000 | 00111 | LOR4+LOR2+LBF+D1[0] |
| 25 | 11001 | 00110 | LOR4+LOR2    +D1[0] |
| 26 | 11010 | 00101 | LOR4    +LBF+D1[0] |
| 27 | 11011 | 00100 | LOR4        +D1[0] |
| 28 | 11100 | 00011 | +LOR2+LBF+D1[0] |
| 29 | 11101 | 00010 | +LOR2    +D1[0] |
| 30 | 11110 | 00001 | +LBF+D1[0] |
| 31 | 11111 | 00000 | +D1[0] |

FIG.7

| shift amount | SF | /SF | signals ORed by OR/BFcircuit 20 |
|---|---|---|---|
| 0 | 00000 | 11111 | ROR16+ROR8+ROR4+ROR2+RBF+D1[31] |
| 1 | 00001 | 11110 | ROR16+ROR8+ROR4+ROR2    +D1[31] |
| 2 | 00010 | 11101 | ROR16+ROR8+ROR4     +RBF+D1[31] |
| 3 | 00011 | 11100 | ROR16+ROR8+ROR4         +D1[31] |
| 4 | 00100 | 11011 | ROR16+ROR8     +ROR2+RBF+D1[31] |
| 5 | 00101 | 11010 | ROR16+ROR8     +ROR2    +D1[31] |
| 6 | 00110 | 11001 | ROR16+ROR8          +RBF+D1[31] |
| 7 | 00111 | 11000 | ROR16+ROR8              +D1[31] |
| 8 | 01000 | 10111 | ROR16     +ROR4+ROR2+RBF+D1[31] |
| 9 | 01001 | 10110 | ROR16     +ROR4+ROR2    +D1[31] |
| 10 | 01010 | 10101 | ROR16     +ROR4     +RBF+D1[31] |
| 11 | 01011 | 10100 | ROR16     +ROR4         +D1[31] |
| 12 | 01100 | 10011 | ROR16          +ROR2+RBF+D1[31] |
| 13 | 01101 | 10010 | ROR16          +ROR2    +D1[31] |
| 14 | 01110 | 10001 | ROR16               +RBF+D1[31] |
| 15 | 01111 | 10000 | ROR16                   +D1[31] |
| 16 | 10000 | 01111 | ROR8+ROR4+ROR2+RBF+D1[31] |
| 17 | 10001 | 01110 | ROR8+ROR4+ROR2    +D1[31] |
| 18 | 10010 | 01101 | ROR8+ROR4     +RBF+D1[31] |
| 19 | 10011 | 01100 | ROR8+ROR4         +D1[31] |
| 20 | 10100 | 01011 | ROR8     +ROR2+RBF+D1[31] |
| 21 | 10101 | 01010 | ROR8     +ROR2    +D1[31] |
| 22 | 10110 | 01001 | ROR8          +RBF+D1[31] |
| 23 | 10111 | 01000 | ROR8              +D1[31] |
| 24 | 11000 | 00111 | ROR4+ROR2+RBF+D1[31] |
| 25 | 11001 | 00110 | ROR4+ROR2    +D1[31] |
| 26 | 11010 | 00101 | ROR4     +RBF+D1[31] |
| 27 | 11011 | 00100 | ROR4         +D1[31] |
| 28 | 11100 | 00011 | +ROR2+RBF+D1[31] |
| 29 | 11101 | 00010 | +ROR2    +D1[31] |
| 30 | 11110 | 00001 | +RBF+D1[31] |
| 31 | 11111 | 00000 | +D1[31] |

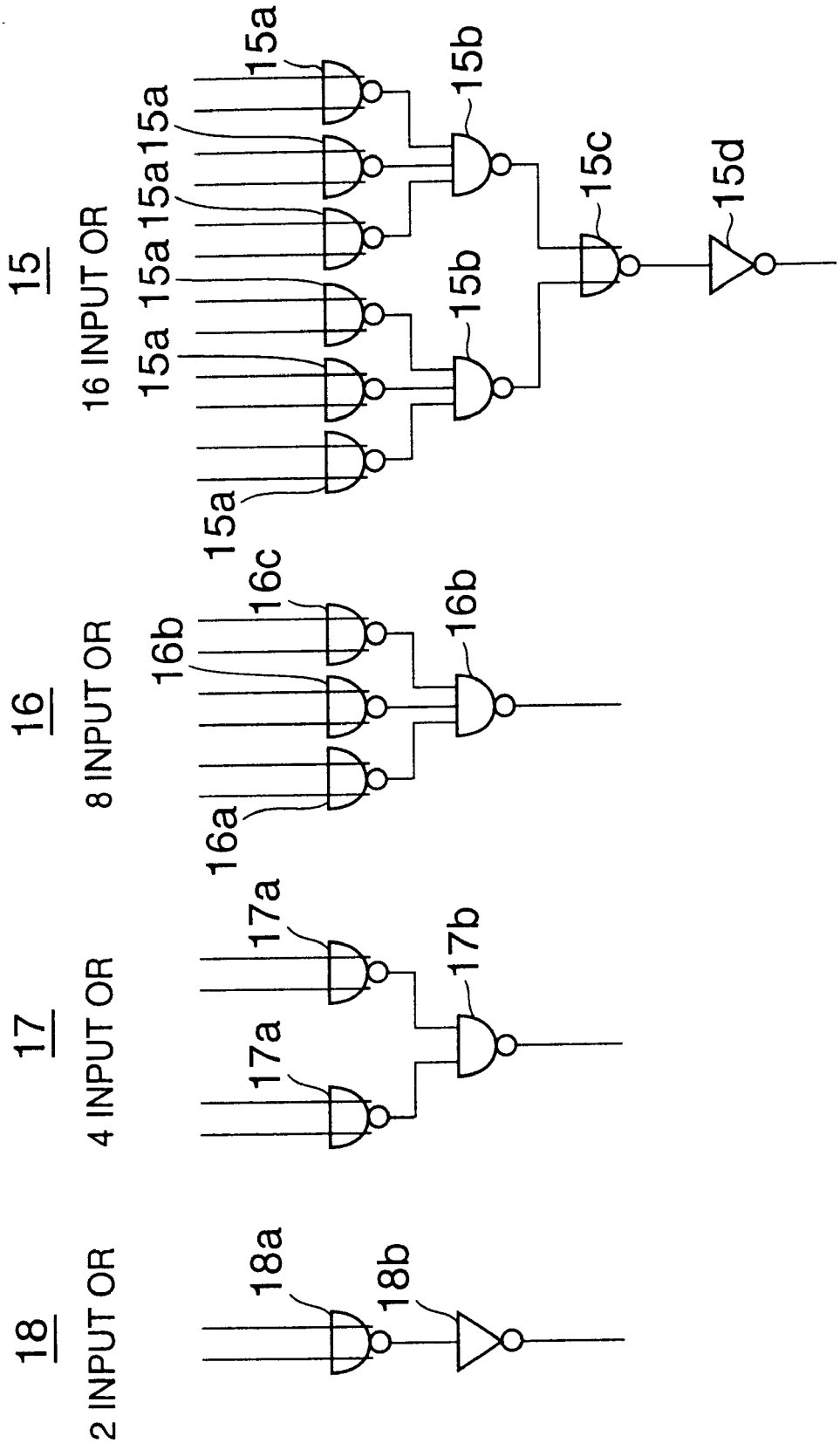

ZERO DETERMINATION SIGNAL GENERATING CIRCUIT

BACKGROUND OF THE INVENTION

1. Field of the Invention

The present invention generally relates to a zero determination signal generating circuit which is mounted, together with a shifter, in an LSI and, generates a zero determination signal for determining whether or not the output data of the shifter is zero, i.e., whether or not all the bits in the output data are logic 0. (Logic 0 will be hereinafter referred to as "0", and logic 1 as "1".)

2. Description of the Related Art

A conventional zero determination signal generating circuit which performs an OR operation on all the bits in the output data of a shifter is often mounted, together with the shifter, in a LSI. However, the conventional zero determination signal generating circuit generates a zero determination signal after shifting operations of the shifter. This hinders a high-speed zero determining operation for the output of the shifter.

SUMMARY OF THE INVENTION

A general object of the present invention is to provide zero determination signal generating circuits, in which the above disadvantages are eliminated.

A more specific object of the present invention is to provide a zero determination signal generating circuit which can perform a zero determining operation for the output data of a shifter at high speed.

The above objects of the present invention are achieved by a zero determination signal generating circuit which generates a zero determination signal for determining whether output data of a shifter is zero, the shifter having first to xth left shifters cascaded where x is an integer of 3 or larger, an ith left shifter which is one of the first to xth left shifters having a $2^x$-bit structure and a shift amount of $2^{x-i}$ bits or 0 bit, $2^x$-bit input data being applied to the first left shifter and $2^x$-bit output data being outputted from the xth left shifter, said zero determination signal generating circuit comprising:

j OR circuits where j=1, 2, . . . , x−1, a kth OR circuit which is one of the j OR circuits corresponding to the kth left shifter and performing an OR operation on bits of the $2^x$-bit data inputted to or outputted from the kth left shifter and located between a digit of the $(2^x-2^{x-k})$th power of 2 and a digit of the $(2^x-2 \cdot 2^{x-k}+1)$th power of 2; and an OR/buffer circuit which performs, when the shift amount is 0 to 30, an OR operation on an output of a first one of the j OR circuits corresponding to one of the left shifters having a shift amount of zero, a bit of the $2^x$-bit data located at a digit of the $(2^x-1)$th power of 2 and outputted from the xth left shifter when not performing a shifting operation, and a bit of the $2^x$-bit input data at a digit of $2^o$, and which performs, when the shift amount is 31, a buffering operation on the bit of the $2^x$-bit input data at a digit of $2^o$, the OR/buffer circuit outputting the zero determination signal.

With the above structure, an OR operation or a buffering operation is performed on predetermined bits in the $2^x$-bit input data to be inputted into left shifters having a shift amount of 0 or in the $2^x$-bit output data outputted from the left shifters having the shift amount of 0. The zero determination signal is then generated through an OR operation or a buffering operation by the OR/buffer circuit. In this manner, the zero determination signal can be generated at the same time that a shifting operation is carried out in the shifter.

The above objects of the preset invention are also achieved by a zero determination signal generating circuit which generates a zero determination signal for determining whether output data of a shifter is zero, the shifter having first to xth right shifters cascaded where x is an integer of 3 or larger, an ith right shifter which is one of the first to xth right shifters having a $2^x$-bit structure and a shift amount of $2^{x-i}$ bits or 0 bit, $2^x$-bit input data being applied to the first right shifter and $2^x$-bit output data being outputted from the xth right shifter, said zero determination signal generating circuit comprising:

j OR circuits where j=1, 2, . . . , x−1, a kth OR circuit which is one of the j OR circuits corresponding to the kth right shifter and performing an OR operation on bits of the $2^x$-bit data inputted to or outputted from the kth right shifter and located between a digit of the $(2^{x-(i-1)}-2)$th power of 2 and a digit of the $(2^{x-i}-1)$th power of 2; and an OR/buffer circuit which performs, when the shift amount is 0 to 30, an OR operation on an output of a first one of the j OR circuits corresponding to one of the right shifters having a shift amount of zero, a bit of the $2^x$-bit data located at a digit of the $2^o$ and outputted from the xth right shifter when not performing a shifting operation, and a bit of the $2^x$-bit input data at a digit of the $(2^x-1)$th power of 2, and which performs, when the shift amount is 31, a buffering operation on the bit of the $2^x$-bit input data at a digit of the $(2^x-1)$th power of 2, the OR/buffer circuit outputting the zero determination signal.

With the above structure, an OR operation or a buffering operation is performed on predetermined bits in the $2^x$-bit input data to be inputted into right shifters having a shift amount of 0 or in the $2^x$-bit output data outputted from the right shifters having the shift amount of 0. The zero determination signal is then generated through an OR operation or a buffering operation by the OR/buffer circuit. In this manner, the zero determination signal can be generated at the same time that a shifting operation is carried out in the shifter.

The above objects of the present invention are also achieved by a zero determination signal generating circuit which generates a zero determination signal for determining whether output data of a shifter is zero, the shifter having a left shifter unit, a right shifter unit, and an output data selector, the left shifter unit having first to xth left shifters cascaded where x is an integer of 3 or larger, an ith left shifter which is one of the first to xth left shifters having a $2^x$-bit structure and a shift amount of $2^{x-i}$ bits or 0 bit, $2^x$-bit input data being applied to the first left shifter and $2^x$-bit output data being outputted from the xth left shifter, the right shifter unit having first to xth right shifters cascaded where x is an integer of 3 or larger, an ith right shifter which is one of the first to xth right shifters having a $2^x$-bit structure and a shift amount of $2^{x-i}$ bits or 0 bit, $2^x$-bit input data being applied to the first right shifter and $2^x$-bit output data being outputted from the xth right shifter, the output data selector which selects and outputs the output data of the left shifter unit when the shifter functions as a left shifter, and which selects and outputs the output data of the right shifter unit when the shifter functions as a right shifter, said zero determination signal generating circuit comprising:

j left-shifter OR circuits where j=1, 2, . . . , x−1, a kth left-shifter OR circuit which is one of the j left-shifter OR circuits corresponding to the kth left shifter and performing an OR operation on bits of the $2^x$-bit data inputted to or outputted from the kth left shifter and located between a digit of the $(2^x-2^{x-k})$th power of 2 and a digit of the $(2^x-2 \cdot 2^{x-k}+1)$th power of 2;

a left-shifter OR/buffer circuit which performs, when the shift amount is 0 to 30, an OR operation on an output of a first one of the j left-shifter OR circuits corresponding to one of the left shifters having a shift amount of zero, a bit of the $2^x$-bit data located at a digit of the $(2^x-1)$th power of 2 and outputted from the xth left shifter when not performing a shifting operation, and a bit of the $2^x$-bit input data at a digit of $2^o$, and which performs, when the shift amount is 31, a buffering operation on the bit of the $2^x$-bit input data at a digit of $2^o$:

j right-shifter OR circuits where j=1, 2, . . . , x−1, a kth right-shifter OR circuit which is one of the j right-shifter OR circuits corresponding to the kth right shifter and performing an OR operation on bits of the $2^x$-bit data inputted to or outputted from the kth right shifter and located between a digit of the $(2^{x-(i-1)}-2)$th power of 2 and a digit of the $(2^{x-i}-1)$th power of 2;

a right-shifter OR/buffer circuit which performs, when the shift amount is 0 to 30, an OR operation on an output of a first one of the j right-shifter OR circuits corresponding to one of the right shifters having a shift amount of zero, a bit of the $2^x$-bit data located at a digit of the $2^o$ and outputted from the xth right shifter when not performing a shifting operation, and a bit of the $2^x$-bit input data at a digit of the $(2^x-1)$th power of 2, and which performs, when the shift amount is 31, a buffering operation on the bit of the $2^x$-bit input data at a digit of the $(2^{x-1})$th power of 2: and a zero determination signal selector which selects and outputs an output of the left-shifter OR/buffer circuit as the zero determination signal when the shifter functions as a left shifter, and which selects and outputs an output of the right-shifter OR/buffer circuit as the zero determination signal when the shifter functions as a right shifter.

With the above structure, when the shifter functions as a left shifter, an OR operation or a buffering operation is performed on predetermined bits in the $2^x$-bit input data to be inputted into left shifters having a shift amount of 0 or in the $2^x$-bit output data outputted from the left shifters having the shift amount of 0. The zero determination signal is then generated through an OR operation or a buffering operation by the OR/buffer circuit. In this manner, the zero determination signal can be generated at the same time that a shifting operation is carried out in the left shifter unit.

When the shifter functions as a right shifter, an OR operation or a buffering operation is performed on predetermined bits in the $2^x$-bit input data to be inputted into right shifters having a shift amount of 0 or in the $2^x$-bit output data outputted from the right shifters having the shift amount of 0. The zero determination signal is then generated through an OR operation or a buffering operation by the OR/buffer circuit. In this manner, the zero determination signal can be generated at the same time that a shifting operation is carried out in the right shifter unit.

The above and other objects and features of the present invention will become more apparent from the following description taken in conjunction with the accompanying drawings.

BRIEF DESCRIPTION OF THE DRAWINGS

FIG. 5 shows the relationship among a shift amount, a shift amount indicating signal, an inverted shift amount indicating signal, and signals subjected to an OR operation by the OR/buffer circuit in the left shifter;

FIG. 7 shows the relationship among a shift amount, a shift amount indicating signal, and signals subjected to an OR operation by the OR/buffer circuit in the right shifter.

FIGS. 16A to 16D show the OR circuits shown in FIG. 1 used in the zero determination signal generating circuit of the present invention.

DESCRIPTION OF THE PREFERRED EMBODIMENTS

The following is a description of embodiments of the present invention, with reference to the accompanying drawings. In the specification and drawings, [j] indicates a digit (bit j) of a digital signal $2^j$, and [j:k] indicates the parts from the digit (bit j) of the digital signal $2^j$ to a digit (bit k) of a digital signal $2^k$.

Figure 1:
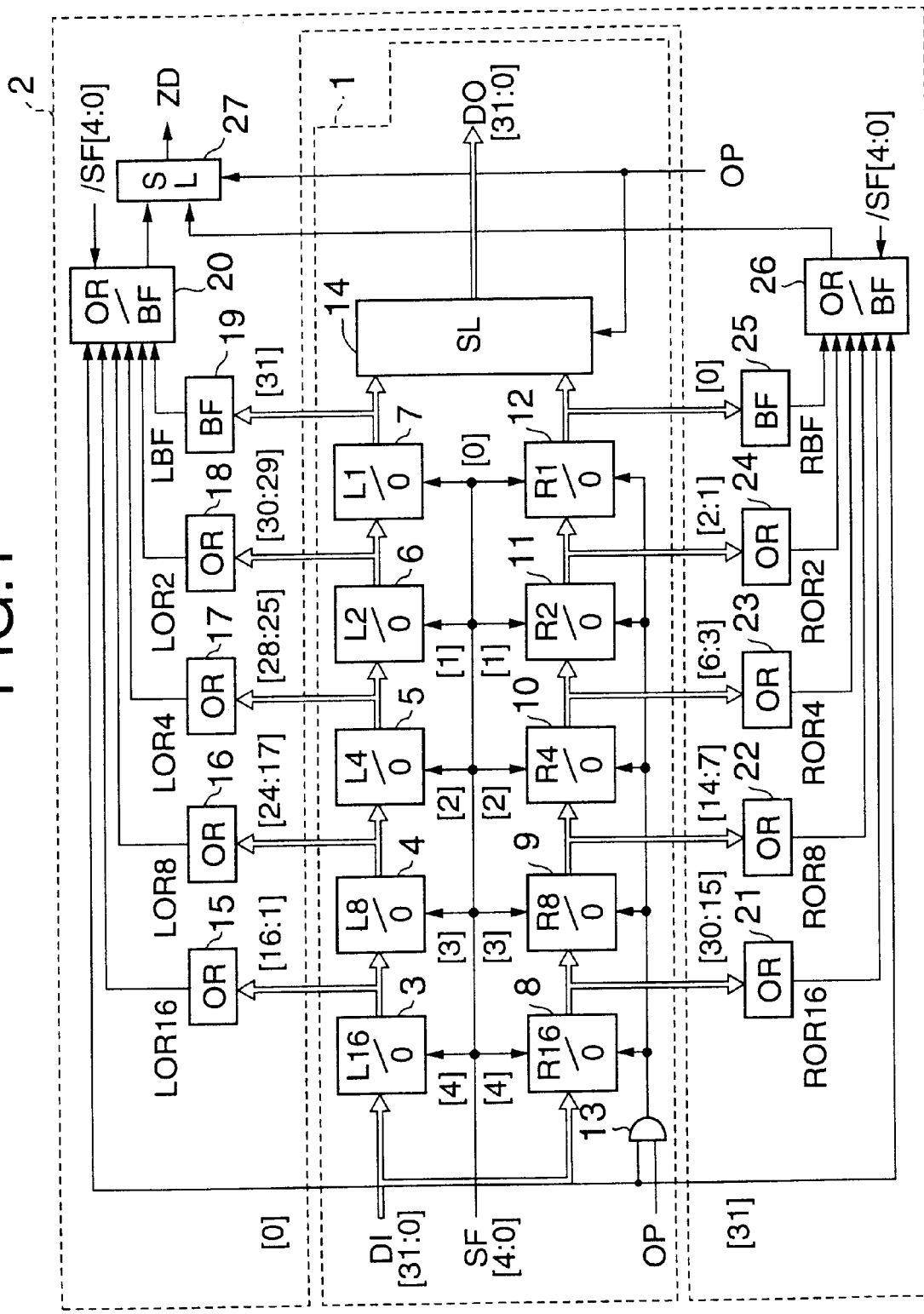
FIG. 1 is a circuit diagram of a shifter and a zero determination signal generating circuit of the present invention.

FIG. 1 is a circuit diagram of a shifter and a zero determination signal generating circuit as an embodiment of the present invention. In this figure, reference numeral 1 indicates a 32-bit shifter having right and left shift directions and a shift amount from 1 to 31, and reference numeral 2 indicates the zero determination signal generating circuit of the embodiment of the present invention.

DI[31:0] represents 32-bit input data to be inputted into the shifter 1, and OP stands for a 1-bit operation code which represents an arithmetic shift and/or a right shift. The OP is "1" to indicates an arithmetic right shift, and "0" to indicate an arithmetic left shift or a logic shift.

SF[4:0] represents a 5-bit shift amount indicating signal for indicating the shift amount, and/SF[4:0] represents a 5-bit inverted shift amount indicating signal which is obtained by inverting the 5-bit shift amount indicating signal SF[4:0]. The decimal number of the shift amount indicating signal SF[4:0] represents the shift amount.

DO[31:0] represents a 32-bit output data of the shifter 1, and ZD is a zero determination signal for determining whether or not the output data DO is zero. When the output data DO is zero, the zero determination signal ZD is "0", and when the output data DO is not zero, the zero determination signal ZD is "1".

Reference numeral 3 indicates a 32-bit left shifter for shifting the input data DI [31:0]. The shifting operation of the left shifter 3 is controlled by the shift amount indicating signal SF[4]. When the shift amount indicating signal SF[4] is "1", the shift amount is 16 bits to the left. When the shift amount indicating signal SF[4] is "0", the shift amount is zero.

Reference numeral 4 indicates a 32-bit left shifter for shifting the output [31:0] of the left shifter 3. The shifting operation of the left shifter 4 is controlled by the shift amount indicating signal SF[3]. When the shift amount indicating signal SF[3] is "1", the shift amount is 8 bits to the left. When the shift amount indicating signal SF[3] is "0", the shift amount is zero.

Reference numeral 5 indicates a 32-bit left shifter for shifting the output [31:0] of the left shifter 4. The shifting operation of the left shifter 5 is controlled by the shift amount indicating signal SF[2]. When the shift amount indicating signal [2] is "1", the shift amount is 4 bits to the left. When the shift amount indicating signal [2] is "0", the shift amount is zero.

Reference numeral 6 indicates a 32-bit left shifter for shifting the output [31:0] of the left shifter 5. The shifting operation of the left shifter 6 is controlled by the shift amount indicating signal SF[1]. When the shift amount indicating signal [1] is "1", the shift amount is 2 bits to the left. When the shift amount indicating signal [0], the shift amount is zero.

Reference numeral 7 indicates a 32-bit left shifter for shifting the output [31:0] of the left shifter 6. The shifting operation of the left shifter 7 is controlled by the shift amount indicating signal SF[0]. If the shift amount indicating signal SF[0] is "1", the shift amount is 1 bit to the left. If the shift amount indicating signal SF[0], the shift amount is zero. The left shifters 3 to 7 constitute a left shifter unit.

Reference numeral 8 indicates a 32-bit right shifter for shifting the input data DI[31:0]. The shifting operation of the right shifter 8 is controlled by the shift amount indicating signal SF [4]. If the shift amount indicating signal SF[4] is "1", the shift amount is 16 bits to the right. If the shift amount indicating signal SF[4] is "0", the shift amount is zero.

Reference numeral 9 indicates a 32-bit right shifter for shifting the output [31:0] of the right shifter 8. The shifting operation of the right shifter 9 is controlled by the shift amount indicating signal SF[3]. If the shift amount indicating signal SF[3] is "1", the shift amount is 8 bits to the right. If the shift amount indicating signal SF[3] is "0", the shift amount is zero.

Reference numeral 10 indicates a 32-bit right shifter for shifting the output [31:0] of the right shifter 9. The shifting operation of the right shifter 10 is controlled by the shift amount indicating signal SF[2]. If the shift amount indicating signal SF[2] is "1", the shift amount is 4 bits to the right. If the shift amount indicating signal SF[2] is "0", the shift amount is zero.

Reference numeral 11 indicates a 32-bit right shifter for shifting the output [31:0] of the right shifter 10. The shifting operation of the right shifter 11 is controlled by the shift amount indicating signal SF[1]. If the shift amount indicating signal SF[1] is "1", the shift amount is 2 bits to the right. If the shift amount indicating signal SF[1] is "0", the shift amount is zero.

Reference numeral 12 indicates a 32-bit right shifter for shifting the output [31:0] of the right shifter 11. The shifting operation of the right shifter 12 is controlled by the shift amount indicating signal SF[0]. If the shift amount indicating signal SF[0] is "1", the shift amount is 1 bit to the right. If the shift amount indicating signal SF[0] is "0", the shift amount is zero. The right shifters 8 to 12 constitute a right shifter unit.

Reference numeral 13 indicates an AND circuit which performs an AND operation on the input data DI[31] and the operation code OP, and supplies its output to the right shifters 8 to 12.

Reference numeral 14 indicates a selector which selects the output data DO[31:0] from the output [31:0] of the left shifter 7 and the output [31:0] of the right shifter 12. The selecting operation of the selector 14 is controlled in accordance with the operation code OP. When the operation code OP is "0", the selector 14 selects the output [31:0] of the left shifter 7. When the operation code OP is "1", the selector 14 selects the output [31:0] of the right shifter 12.

Reference numeral 15 indicates an OR circuit which performs an OR operation on the output [16:1] of the left shifter 3. Reference numeral 16 indicates an OR circuit which performs an OR operation on the output [24:17] of the left shifter 4. Reference numeral 17 indicates an OR circuit which performs an OR operation on the output [28:25] of the left shifter 5. Reference numeral 18 indicates an OR circuit which performs an OR operation on the output [30:29] of the left shifter 6. Reference numeral 19 indicates a buffer circuit which buffers the output [31] of the left shifter 7.

Reference numeral 20 indicates an OR/buffer circuit which receives the outputs LOR16, LOR8, LOR4, and LOR2 of the OR circuits 15, 16, 17, and 18, respectively, and the output LBF of the buffer circuit 19. The OR/buffer circuit 20 is controlled by the inverted shift amount indicating signal/SF[4:0]. When the shift amount is 0 to 30, the OR/buffer circuit 20 serves as an OR circuit which performs an OR operation on the input data DI[0] and the signal selected from the output LBF of the buffer circuit 19 and the outputs LOR16, LOR8, LOR4, and LOR2 of the OR circuits 15, 16, 17, and 18, respectively. When the shift amount is 31, the OR/buffer circuit 20 serves as a buffer circuit which buffers the input data DI[0].

Reference numeral 21 indicates an OR circuit which performs an OR operation on the output [30:15] of the right shifter 8. Reference numeral 22 indicates an OR circuit which performs an OR operation on the output [14:7] of the right shifter 9. Reference numeral 23 indicates an OR circuit which performs an OR operation on the output [6:3] of the right shifter 10. Reference numeral 24 indicates an OR circuit which performs an OR operation on the output [2:1] of the right shifter 11. Reference numeral 25 indicates a buffer circuit which buffers the output [0] of the right shifter 12.

Reference numeral 26 indicates an OR/buffer circuit which receives the outputs ROR16, ROR8, ROR4, and ROR2 of the OR circuits 21, 22, 23, and 24, respectively, and the output RBF of the buffer circuit 25. The OR/buffer circuit 26 is controlled by the inverted shift amount indicating signal/SF[4:0]. When the shift amount is 0 to 30, the OR/buffer circuit 26 serves as an OR circuit which performs an OR operation on the input data DI[31] and the signal selected from the output RBF of the buffer circuit 25 and the outputs ROR16, ROR8, ROR4, and ROR2 of the OR circuits 21, 22, 23, and 24, respectively. When the shift amount is 31, the OR/buffer circuit 26 serves as a buffer circuit which buffers the input data DI[31].

Reference numeral 27 indicates a selector which selects the zero determination signal ZD from the output of the OR/buffer circuit 20 and the output of the OR/buffer circuit 26. The selecting operation of the selector 27 is controlled in accordance with the operation code OP. When the operation code OP is "0", the selector 27 selects the output of the OR/buffer circuit 20. When the operation code OP is "1", the selector 27 selects the output of the OR/buffer circuit 26.

Figure 2:
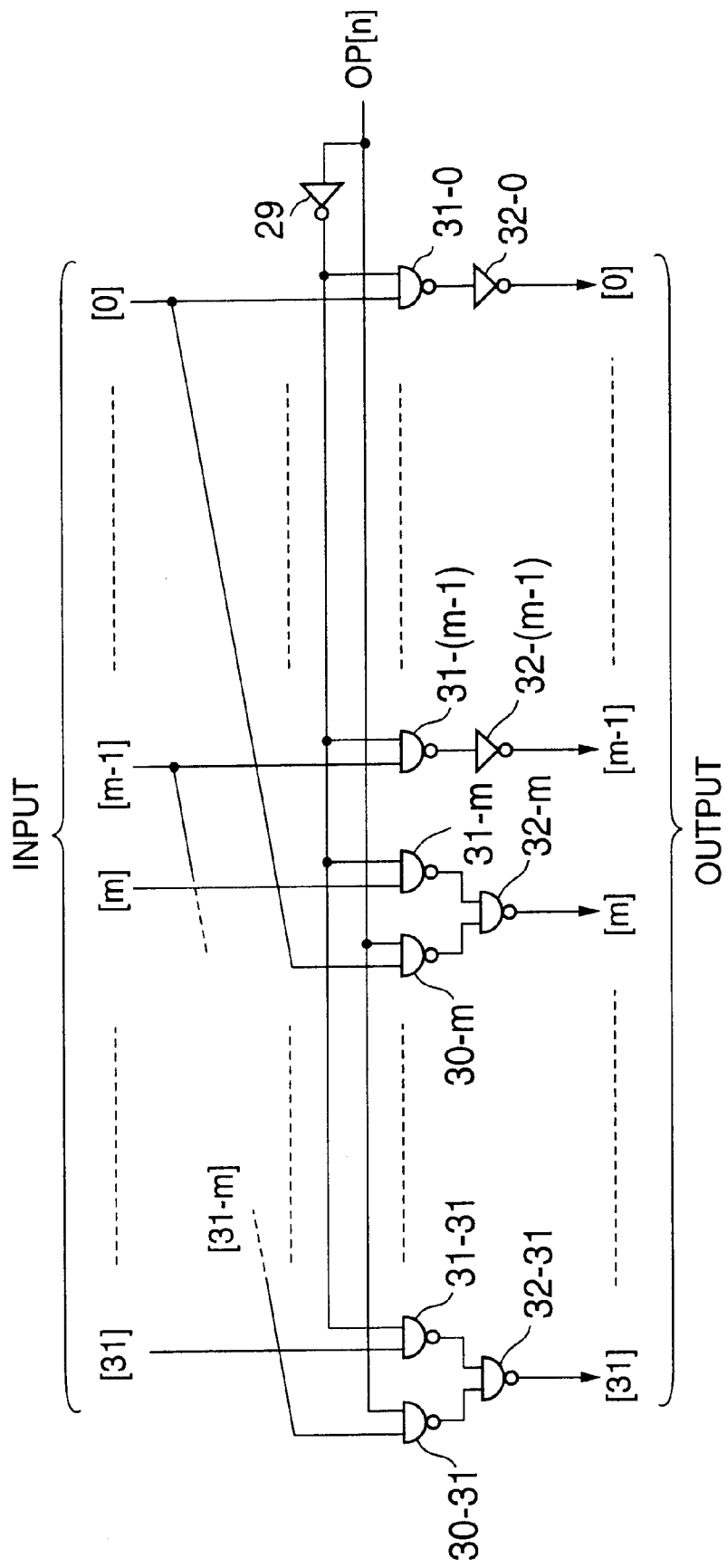
FIG. 2 is a circuit diagram of a left shifter included in the shifter shown in FIG. 1.

FIG. 2 is a circuit diagram showing an example configuration of the left shifters 3 to 7. In the case of the left shifter 3, m is "16", and n is "4". In the case of the left shifter 4, m is "8", and n is "3". In the case of the left shifter 5, m is "4", and n is "2". In the case of the left shifter 6, m is "2", and n is "1". In the case of the left shifter 7, m is "1", and n is "0".

In FIG. 2, reference numeral 29 indicates an inverter which inverts the operation code OP[n], reference numeral 30-31 indicates a NAND circuit which performs a NAND operation on the operation code OP[n] and an input [31-m], and reference numeral 30-m indicates a NAND circuit which performs a NAND operation on the operation code OP[n] and an input [0].

Reference numeral 31-31 indicates a NAND circuit which performs a NAND operation on the output of the inverter 29 and an input [31]. Reference numeral 31-m indicates a NAND circuit which performs a NAND operation on the output of the inverter 29 and an input [m]. Reference numeral 31-(m−1) indicates a NAND circuit which performs a NAND operation on the output of the inverter 29 and an input [m−1]. Reference numeral 31-0 indicates a NAND circuit which performs a NAND operation on the output of the inverter 29 and the input [0].

Reference numeral 32-31 indicates a NAND circuit which performs a NAND operation on the outputs of the NAND circuits 30-31 and 31-31 to generate an output [31]. Reference numeral 32-m indicates a NAND circuit which performs a NAND operation on the outputs of the NAND circuits 30-m and 31-m to generate an output [m]. Reference numeral 32-(m−1) indicates an inverter which inverts the output of the NAND circuit 31-(m−1) to generate an output [m−1]. Reference numeral 32-0 indicates an inverter which inverts the output of the NAND circuit 31-0 to generate an output [0].

When the operation code OP[n] is "1" in the left shifter shown in FIG. 2, each of the NAND circuits 30-31 to 30-m serves as an inverter for the input [31-m:0], the output of the inverter 29 becomes "1", and each of the outputs of the NAND circuits 31-31 to 31-0 is fixed at "1". As a result, the NAND circuits 32-31 to 32-m serve as inverters for the NAND circuits 30-31 to 30-m, respectively, and each of the outputs of the inverters 32-(m−1) to 32-0 becomes "1". Thus, the left shifter shown in FIG. 2 functions as a shifter having a shift amount of m bits to the left.

When the operation code OP[n] is "0", each of the outputs of the NAND circuits 30-31 to 30-m is fixed at "1", the output of the inverter 29 becomes "1", and each of the NAND circuits 31-31 to 31-0 serves as an inverter for the input [31:0]. As a result, the NAND circuits 32-31 to 32-m serve as inverters for the NAND circuits 31-31 to 31-m, respectively. Thus, the left shifter shown in FIG. 2 functions as a buffer for the input [31:0], having a shift amount of 0.

Figure 3:
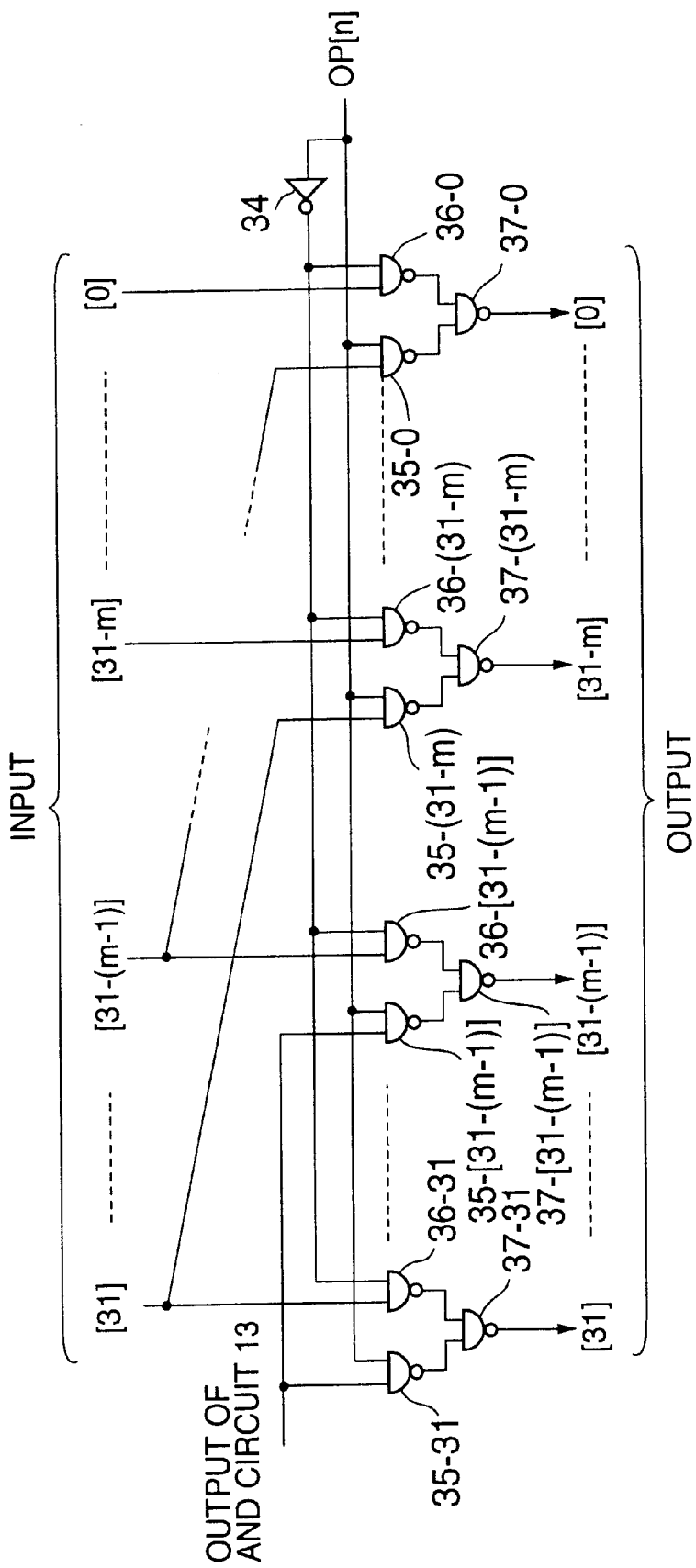
FIG. 3 is a circuit diagram of a right shifter included in the shifter shown in FIG. 1.

FIG. 3 is a circuit diagram showing an example configuration of the right shifters 8 to 12. In the case of the right shifter 8, m is 16, and n is 4. As for the right shifter 9, m is 8, and n is 3. As for the right shifter 10, m is 2, and n is 1. As for the right shifter 12, m is 1, and n is 0.

In FIG. 3, reference numeral 34 indicates an inverter which inverts the operation code OP[n], reference numeral 35-31 indicates a NAND circuit which performs a NAND operation on the operation code OP[n] and the output of the AND circuit 13, and reference numeral 35-[31-(m−1)] indicates a NAND circuit which performs a NAND operation on the operation code OP[n] and the output of the AND circuit 13.

Reference numeral 35-(31-m) indicates a NAND circuit which performs a NAND operation on the operation code OP[n] and an input [31], and reference numeral 35-0 indicates a NAND circuit which performs a NAND operation on the operation code OP[n] and an input [m].

Reference numeral 36-31 is a NAND circuit which performs a NAND operation on the output of the inverter 34 and the input [31]. Reference numeral 36-[31-(m−1)] indicates a NAND circuit which performs a NAND operation on the output of the inverter 34 and an input [31-(m−1)]. Reference numeral 36-(31-m) indicates a NAND circuit which performs a NAND operation on the output of the inverter 34 and an input [31-m]. Reference numeral 36-0 indicates a NAND circuit which performs a NAND operation on the output of the inverter 34 and an input [0].

Reference numeral 37-31 indicates a NAND circuit which performs a NAND operation on the outputs of the NAND circuits 35-31 and 36-31 to generate an output [31]. Reference numeral 37-[31-(m−1)] indicates a NAND circuit which performs a NAND operation on the outputs of the NAND circuits 35-[31-(m−1)] and 36-[31-(m−1)] to generate an output [31-(m−1)]. Reference numeral 37-(31-m) indicates a NAND circuit which performs a NAND operation on the outputs of the NAND circuits 35-(31-m) and 36-(31-m) to generate an output [31-m]. Reference numeral 37-0 indicates a NAND circuit which performs a NAND operation on the outputs of the NAND circuits 35-0 and 36-0 to generate an output [0].

When the operation code OP[n] is "1" in the right shifter shown in FIG. 3, each of the NAND circuits 35-31 to 35-[31-(m−1)] serves as an inverter for the output of the AND circuit 13, each of the NAND circuits 35-(31-m) to 35-0 serves as an inverter for an input [31:m], the output of the inverter 34 becomes "0", and each of the outputs of the NAND circuits 36-31 to 36-0 is fixed at "1". As a result, the NAND circuits 37-31 to 37-0 serve as inverters for the NAND circuits 35-31 to 35-0, respectively. Thus, the right shifter shown in FIG. 3 functions as a shifter having a shift amount of m bits to the right.

When the operation code OP[n] is "0", each of the outputs of the NAND circuits 35-31 to 35-0 is fixed at "1", the output of the inverter 34 becomes "1", and each of the NAND circuits 36-31 to 36-0 serves as an inverter for an input [31:0]. As a result, the NAND circuits 37-31 to 37-0 serve as inverters for the NAND circuits 36-31 to 36-0, respectively. Thus, the right shifter shown in FIG. 3 functions as a buffer for the input [31:0], having a shift amount of 0.

Figure 4:
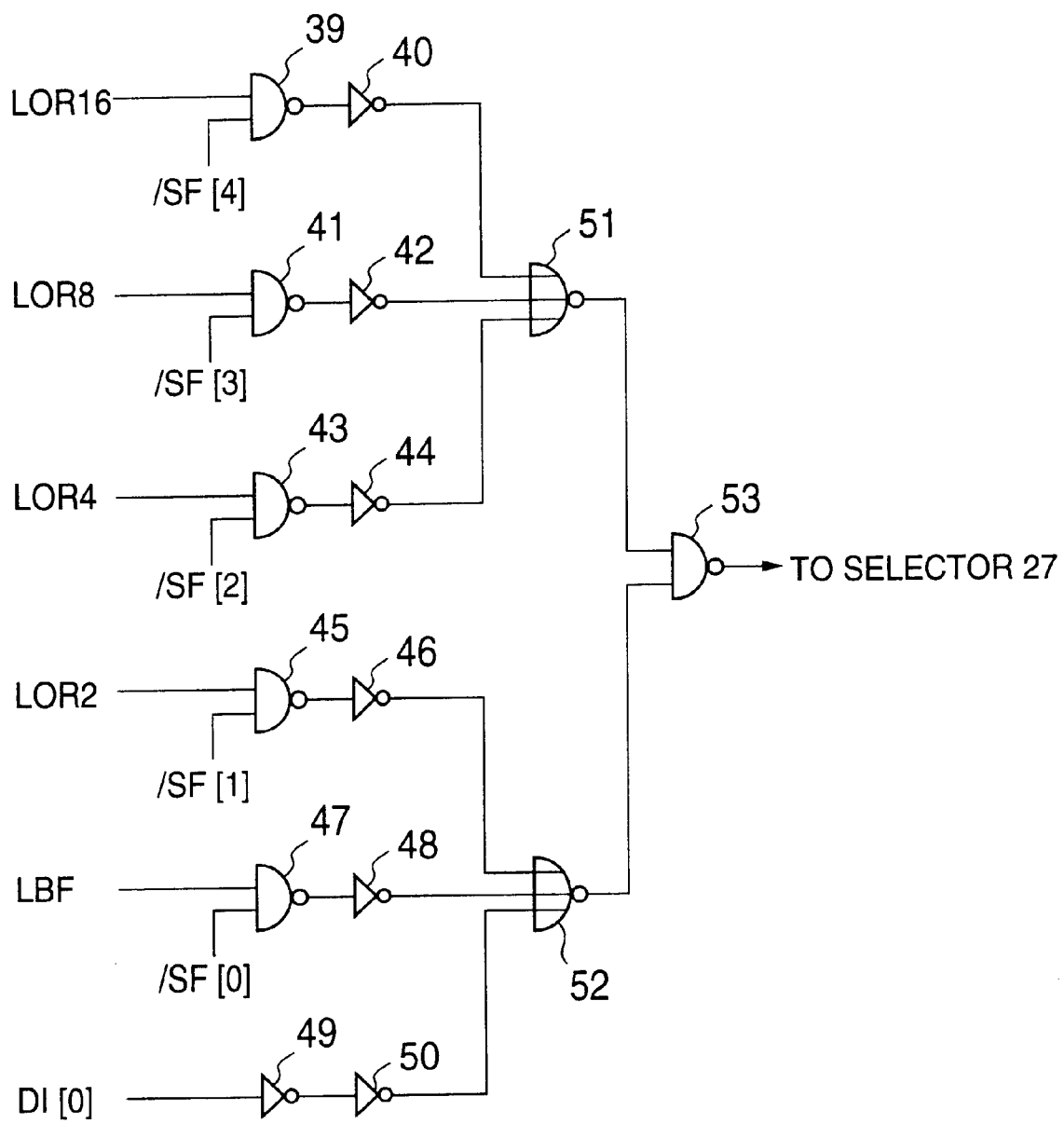
FIG. 4 is a circuit diagram showing the configuration of an OR/buffer circuit in a left shifter unit of the zero determination signal generating circuit of the present invention.

FIG. 4 is a circuit diagram showing the structure of the OR/buffer circuit 20. In this figure, reference numeral 39 indicates a NAND circuit which performs a NAND operation on the output LOR16 of the OR circuit 15 and the inverted shift amount indicating signal/SF[4], and reference numeral 40 indicates an inverter which inverts the output of the NAND circuit 39. Reference numeral 41 indicates a NAND circuit which performs a NAND operation on the output LOR8 of the OR circuit 16 and the inverted shift amount indicating signal /SF[3], and reference numeral 42 indicates an inverted which inverts the output of the NAND circuit 41.

Reference numeral 43 indicates a NAND circuit which performs a NAND operation on the output LOR4 of the OR circuit 17 and the inverted shift amount indicating signal/ SF[2], and reference numeral 44 indicates an inverter which inverts the output of the NAND circuit 43. Reference numeral 45 indicates a NAND circuit which performs a NAND operation on the output LOR2 of the OR circuit 18 and the inverted shift amount indicating signal /SF[1], and reference numeral 46 indicates an inverter which inverts the output of the NAND circuit 45.

Reference numeral 47 indicates a NAND circuit which performs a NAND operation on the output LBF of the buffer circuit 19 and the inverted shift amount indicating signal/ SF[0], and reference numeral 48 indicates an inverter which inverts the output of the NAND circuit 47. Reference numeral 49 indicates an inverter which inverts the input data DI[0], and reference numeral 50 indicates an inverter which inverts the output of the inverter 49.

Reference numeral 51 indicates a NOR circuit which performs a NOR operation on the outputs of the inverters 40, 42, and 44. Reference numeral 52 indicates a NOR circuit which performs a NOR operation on the outputs of the inverters 46, 48, and 50. Reference numeral 53 indicates a NAND circuit which performs a NAND operation on the outputs of the NOR circuits 51 and 52.

FIG. 5 shows the relationship among the shift amount, the shift amount indicating signal SF[4:0], the inverted shift amount indicating signal /SF[4:0], and signals subjected to an OR operation by the OR/buffer circuit 20. With the shift amount being 0 to 30, the OR/buffer circuit 20 performs an OR operation on the outputs of the OR circuits 15 to 18 corresponding to left shifters having a shift amount of 0, or the output LBF of the buffer circuit 19 when the left shifter 7 is not performing a shifting operation. With the shift amount being 31, the OR/buffer circuit 20 buffers the input data DI[0].

Figure 6:
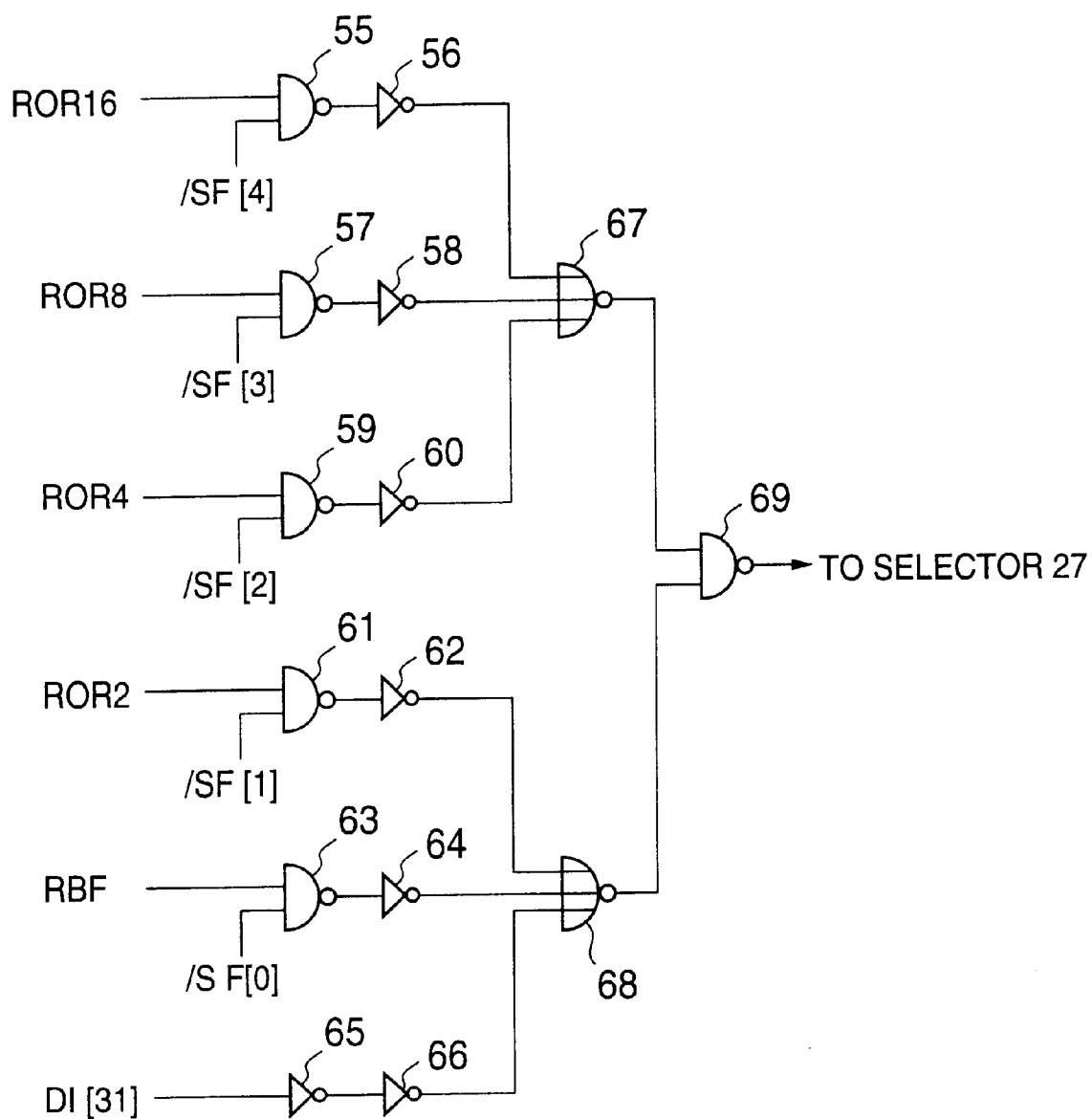
FIG. 6 is a circuit diagram showing the configuration of an OR/buffer circuit in a right shifter unit of the zero determination signal generating circuit of the present invention.

FIG. 6 is a circuit diagram showing the structure of the OR/buffer circuit 26. In this figure, reference numeral 55 indicates a NAND circuit which performs a NAND operation on the output ROR16 of the OR circuit 21 and the shift amount indicating signal SF[4], and reference numeral 56 indicates an inverter which inverts the outputs of the NAND circuit 55. Reference numeral 57 indicates a NAND circuit which performs a NAND operation on the output ROR8 of the OR circuit 22 and the shift amount indicating signal SF[3], and reference numeral 58 indicates an inverter which inverts the output of the NAND circuit 57.

Reference numeral 59 indicates a NAND circuit which performs a NAND operation on the output ROR4 of the OR circuit 23 and the shift amount indicating signal SF[2], and reference numeral 60 indicates an inverter which inverts the output of the NAND circuit 59. Reference numeral 61 indicates a NAND circuit which performs a NAND operation on the output ROR2 of the OR circuit 24 and the shift amount indicating signal SF[1], and reference numeral 62 indicates an inverter which inverts the output of the NAND circuit 61.

Reference numeral 63 indicates a NAND circuit which performs a NAND operation on the output RBF of the buffer circuit 25 and the shift amount indicating signal SF[0], and reference numeral 64 indicates an inverter which inverts the output of the NAND circuit 63. Reference numeral 65 indicates an inverter which inverts the input data DI[31], and reference numeral 66 indicates an inverter which inverts the output of the inverter 65.

Reference numeral 67 indicates a NOR circuit which performs a NOR operation on the outputs of the inverters 56, 58, and 60. Reference numeral 68 indicates a NOR circuit which performs a NOR operation on the outputs of the inverters 62, 64, and 66. Reference numeral 69 indicates a NAND circuit which performs a NAND operation on the outputs of the NOR circuits 67 and 68.

FIG. 7 shows the relationship among the shift amount, the inverted shift amount indicating signal/SF[4:0], and signals subjected to an OR operation by the OR/buffer circuit 26. With the shift amount being 0 to 30, the OR/buffer circuit 26 performs an OR operation on the outputs of the OR circuits 21 to 24 corresponding to right shifters having a shift amount of 0, or the output RBF of the buffer circuit 25 when the right shifter 12 is not performing a shifting operation. With the shift amount being 31, the OR/buffer circuit 26 buffers the input data DI[0].

Figure 8:
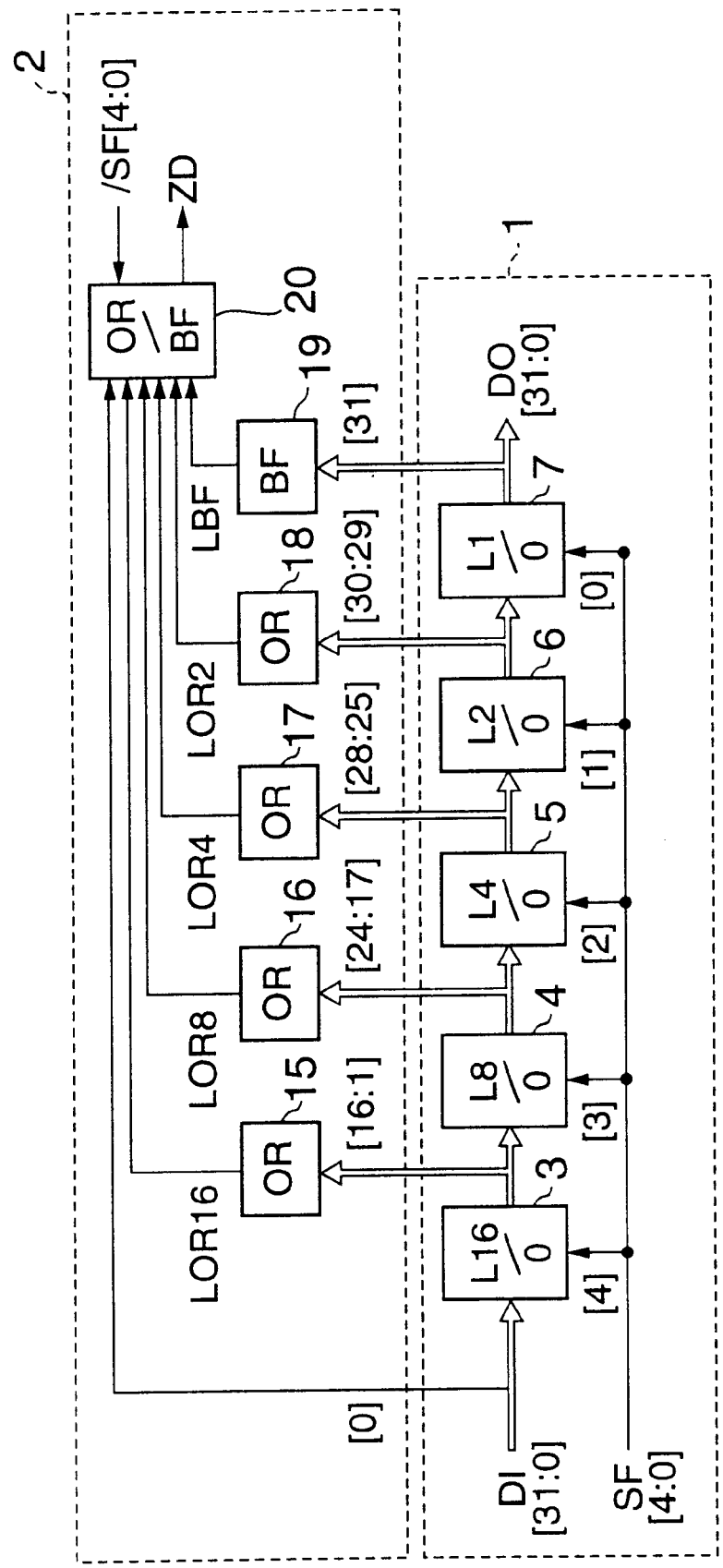
FIG. 8 is an equivalent circuit diagram of the shifter and the zero determination signal generating circuit of the present invention shown in FIG. 1 in a case where the shifter is a left shifter.

When the operation code OP is "0" in the zero determination signal generating circuit having the above structure, the selector 14 selects the output [31:0] of the left shifter 7 as the output data DO[31:0], and the selector 27 selects the output of the OR/buffer circuit 20 as the zero determination signal ZD. Accordingly, the shifter 1 and the zero determination signal generating circuit 2 of the present invention become equivalent to a configuration shown in FIG. 8.

Figure 9:
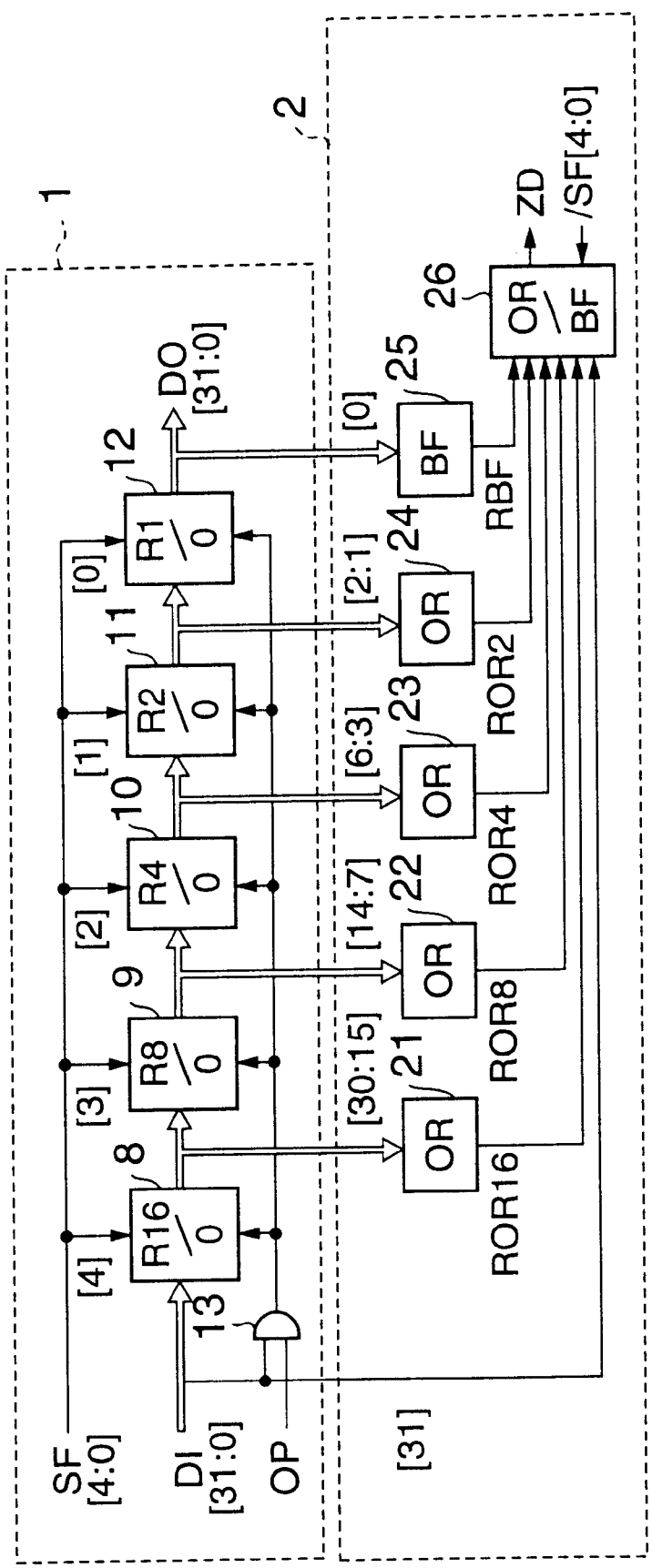
FIG. 9 is an equivalent circuit diagram of the shifter and the zero determination signal generating circuit of the present invention shown in FIG. 1 in a case where the shifter is a right shifter.

When the operation code OP is "1", on the other hand, the selector 14 selects the output [31:0] of the right shifter 12 as the output data DO[31:0], and the selector 27 selects the output of the OR/buffer circuit 26 as the zero determination signal ZD. Accordingly, the shifter 1 and the zero determination signal generating circuit 2 of the present invention become equivalent to a configuration shown in FIG. 9.

Figure 10:
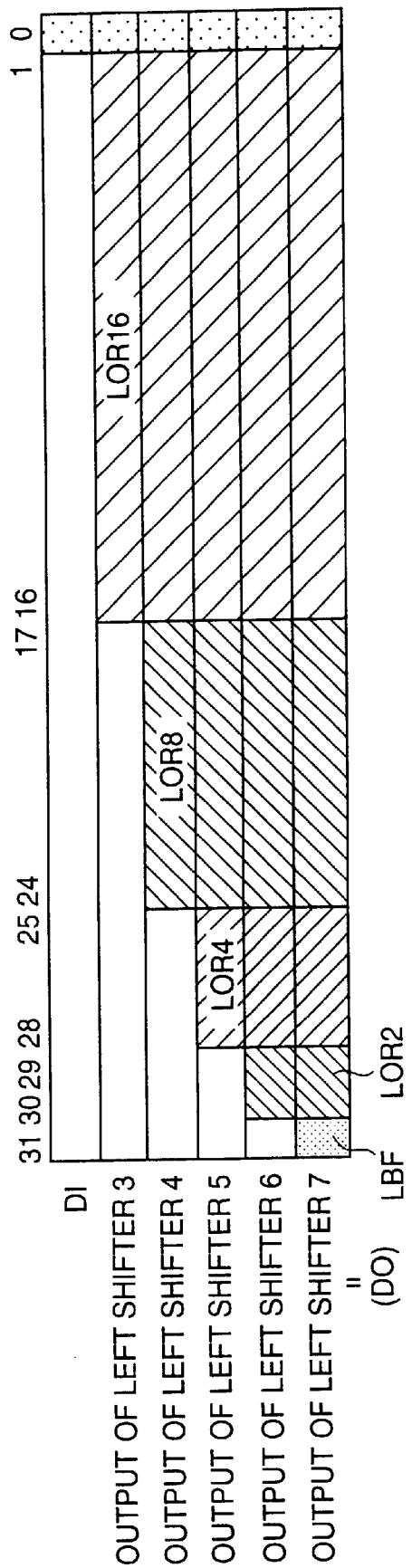
FIG. 10 illustrates an operation of the zero determination signal generating circuit of the present invention in a case where the shifter is a left shifter and the shift amount is zero.

FIG. 10 illustrates an operation of the zero determination signal generating circuit 2 of the present invention in a case where the shifter 1 functions as a left shifter and the shift amount is 0. To determine whether or not the output data DO[31:0] is zero, all the bits contained in the output data DO[31:0] need to be subjected to an OR operation.

Here, the logic values of the output data DO[31], DO[30:29], DO[28:25], DO[24:17], DO[16:1], and DO[0]

are equal to logic values of the output [31] of the left shifter 7, the output [30:29] of the left shifter 6, the output [28:25] of the left shifter 5, the output [24:17] of the left shifter 4, the output [16:1] of the left shifter 3, and the input data DI[0], respectively.

In such a case, the OR/buffer circuit 20 performs an OR operation on the output LOR16 of the OR circuit 15, the output LOR8 of the OR circuit 16, the output LOR4 of the OR circuit 17, the output LOR2 of the OR circuit 18, the output LBF of the buffer circuit 19, and the input data DI[0], as shown in FIG. 5. Accordingly, the OR/buffer circuit 20 equivalently performs an OR operation on the output data DO[31:0], and outputs the result as the zero determination signal ZD.

Figure 11:
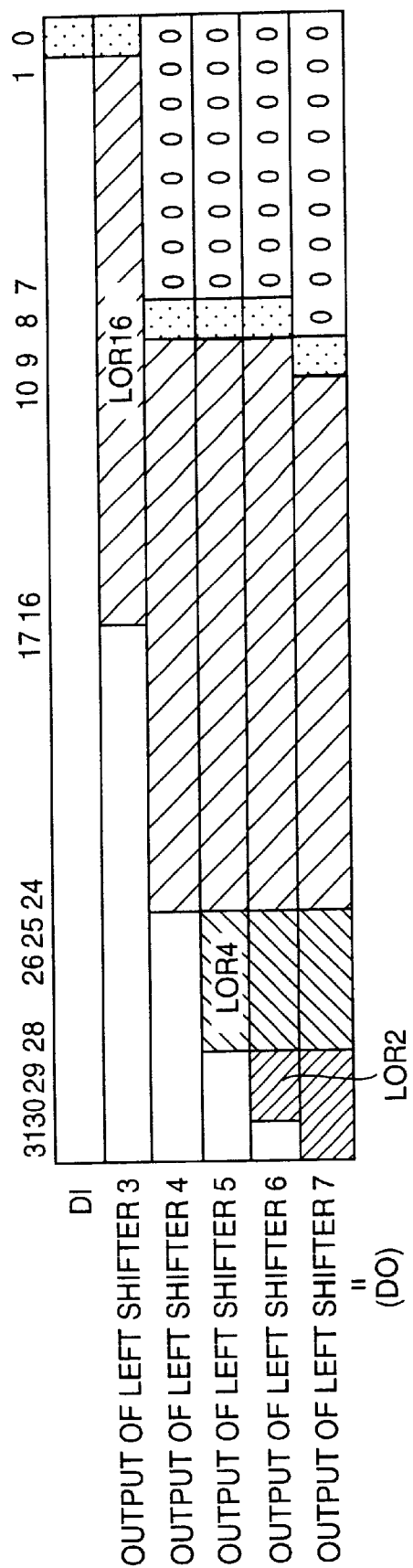
FIG. 11 illustrates an operation of the zero determination signal generating circuit of the present invention in a case where the shifter is a left shifter and the shift amount is 9.

FIG. 11 illustrates an operation of the zero determination signal generating circuit 2 of the present invention in a case where the shifter 1 functions as a left shifter and the shift amount is 9. Since the output data DO[8:0] is zero in this case, it is necessary to perform an OR operation on the output data DO[31:9] to determine whether or not the output data DO[31:0] is zero.

Here, the logic values of the output data DO[31:30], DO[29:26], DO[25:10], and DO[9] are equal to the logic values of the output [30:29] of the left shifter 6, the output [28:25] of the left shifter 5, the output [16:1] of the left shifter 3, and the input data DI[0], respectively.

The OR/buffer circuit 20 performs an OR operation on the output LOR16 of the OR circuit 15, the output LOR4 of the OR circuit 17, the output LOR2 of the OR circuit 18, and the input data DI[O]. Accordingly, the OR/buffer circuit 20 equivalently performs an OR operation on the output data DO[31:9], and outputs the result as the zero determination signal ZD.

Figure 12:
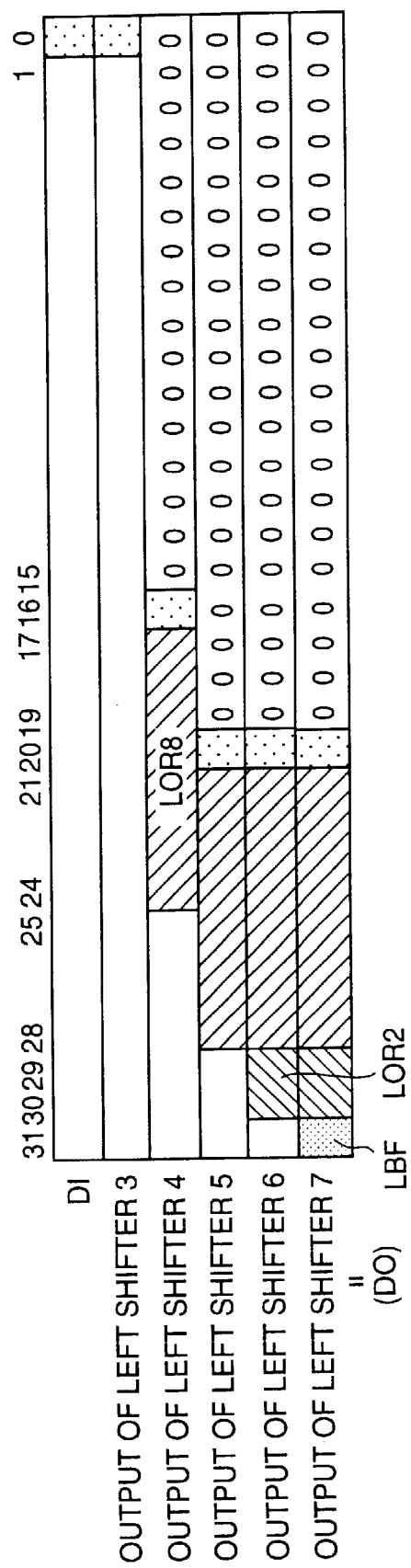
FIG. 12 illustrates an operation of the zero determination signal generating circuit of the present invention in a case where the shifter is a left shifter and the shift amount is 20.

FIG. 12 illustrates an operation of the zero determination signal generating circuit 2 of the present invention in a case where the shifter 1 functions as a left shifter and the shift amount is 20. Since the output data DO[19:0] is zero in this case, it is necessary to perform an OR operation on the output data DO[31:20] to determine whether or not the output data DO[31:0] is zero.

Here, the logic values of the output data DO[31], DO[30:29], DO[28:21], and DO[20] are equal to the logic values of the output [31] of the left shifter 7, the output [30:29] of the left shifter 6, the output [24:17] of the left shifter 4, and the input data DI[0], respectively.

The OR/buffer circuit 20 performs an OR operation on the output LOR4 of the OR circuit 16, the output LOR2 of the OR circuit 18, the output LBF of the buffer circuit 19, and the input data DI[0], as shown in FIG. 5. Accordingly, the OR/buffer circuit 20 equivalently performs an OR operation on the output data DO[31:20], and outputs the result as the zero determination signal ZD.

Figure 13:
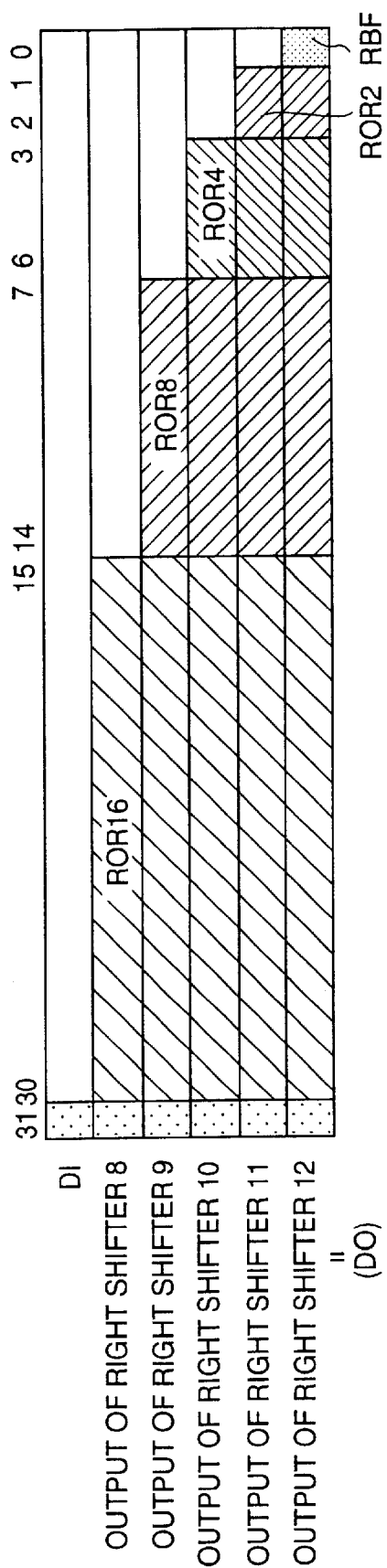
FIG. 13 illustrates an operation of the zero determination signal generating circuit of the present invention in a case where the shifter is a right shifter and the shift amount is zero.

FIG. 13 illustrates an operation of the zero determination signal generating circuit 2 of the present invention in a case where the shifter 1 functions as a right shifter and the shift amount is zero. To determine whether or not the output data DO[31:0] is zero in this case, all the bits contained in the output data DO[31:0] need to be subjected to an OR operation.

Here, the logic values of the output data DO[31], DO[30:15], DO[14:7], DO[6:3], DO[2:1], and DO[0] are equal to the logic values of the input data DI[31], the output [30:15] of the right shifter 8, the output [14:7] of the right shifter 9, the output [6:3] of the right shifter 10, the output [2:1] of the right shifter 11, and the output [0] of the right shifter 12, respectively.

The OR/buffer circuit 26 performs an OR operation on the output ROR16 of the OR circuit 21, the output ROR8 of the OR circuit 22, the output ROR4 of the OR circuit 23, the output ROR2 of the OR circuit 24, the output RBF of the buffer circuit 25, and the input data DI[31], as shown in FIG. 7. Accordingly, the OR/buffer circuit 26 equivalently performs an OR operation on all the bits contained in the output data DO[31:0], and outputs the result as the zero determination signal ZD.

Figure 14:
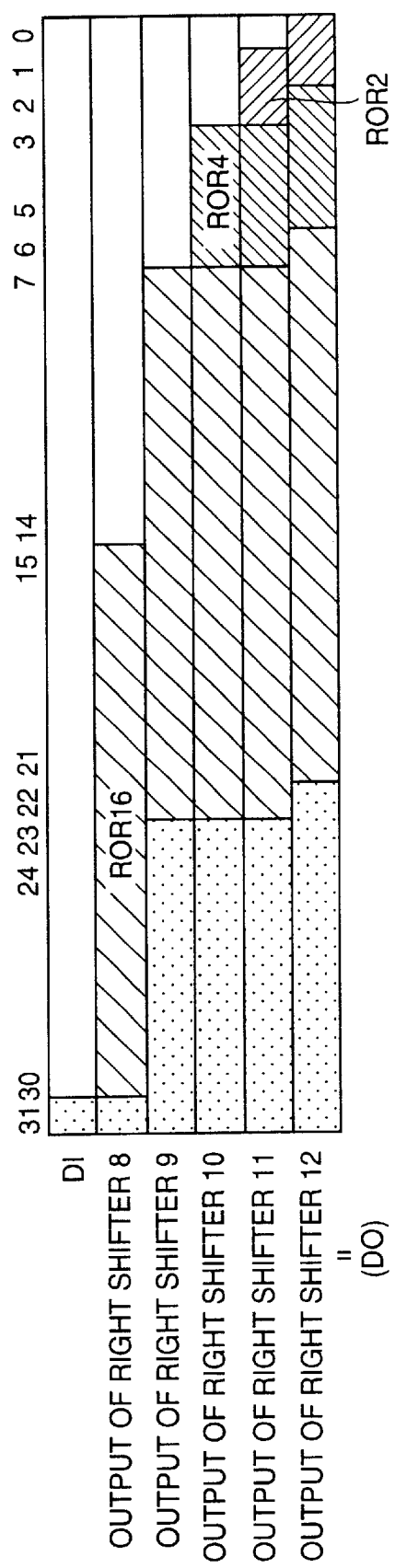
FIG. 14 illustrates an operation of the zero determination signal generating circuit of the present invention in a case where the shifter is a right shifter and the shift amount is 9.

FIG. 14 illustrates an operation of the zero determination signal generating circuit 2 of the present invention in a case where the shifter 1 functions as a right shifter and the shift amount is 9. To determine whether or not the output data DO[31:0] is zero in this case, all the bits contained in the output data DO[31:0] need to be subjected to an OR operation.

Here, the logic values of the output data DO[31:22], DO[21:6], DO[5:2], DO[1:0] are equal to the logic values of the input data DI[31], the output [30:15] of the right shifter 8, the output [6:3] of the right shifter 10, and the output [2:1] of the right shifter 11, respectively.

The OR/buffer circuit 26 performs an OR operation on the output ROR16 of the OR circuit 21, the output ROR4 of the OR circuit 23, the output ROR2 of the OR circuit 24, and the input data DI[31], as shown in FIG. 7. Accordingly, the OR/buffer circuit 26 equivalently performs an OR operation on all the bits contained in the output data DO[31:0], and outputs the result as the zero determination signal ZD.

Figure 15:
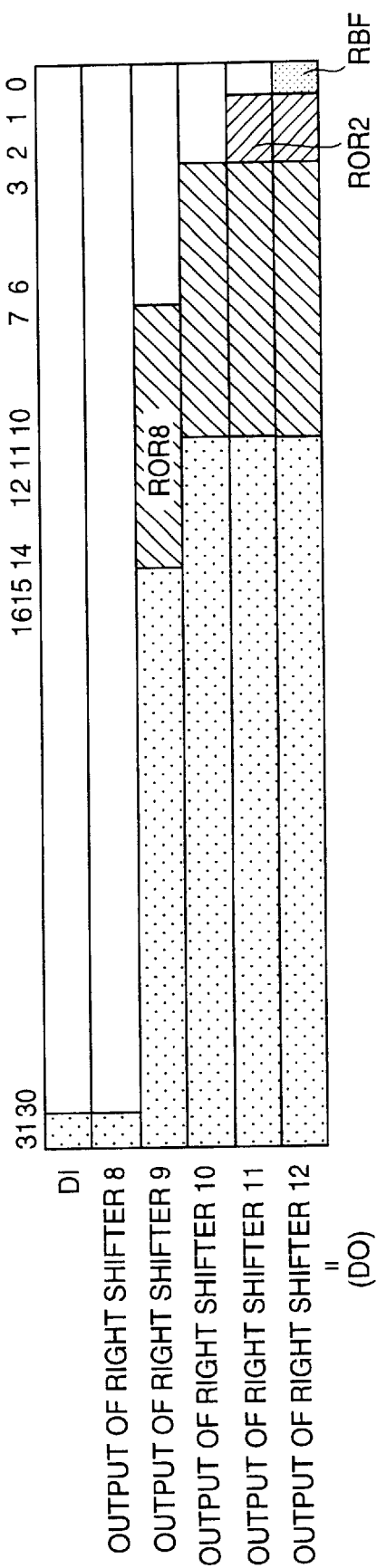
FIG. 15 illustrates an operation of the zero determination signal generating circuit of the present invention in a case where the shifter is a right shifter and the shift amount is 20.

FIG. 15 illustrates an operation of the zero determination signal generating circuit 2 of the present invention in a case where the shifter 1 functions as a right shifter and the shift amount is 20. To determine whether or not the output data DO[31:0] is zero, all the bits contained in the output data DO[31:0] need to be subjected to an OR operation.

Here, the logic values of the output data DO[31:11], DO[10:3], DO[2:1], and DO[0] are equal to the logic values of the input data DI[31], the output [14:7] of the right shifter 9, the output [2:1] of the right shifter 11, and the output [0] of the right shifter 12, respectively.

The OR/buffer circuit 26 performs an OR operation on the output ROR8 of the OR circuit 22, the output ROR2 of the OR circuit 24, the output RBF of the buffer circuit 25, and the input data DI[31], as shown in FIG. 7. Accordingly, the OR/buffer circuit 26 equivalently performs an OR operation on all the bits in the output data DO[31:0], and outputs the results as the zero determination signal ZD.

As described above, in the case where the shifter 1 functions as a left shifter, the zero determination signal generating circuit 2 of the present invention performs an OR operation on or buffers predetermined bits in the 32-bit data outputted from left shifters having a shift amount of 0 among the left shifters 3 to 7, at the same time as a shifting operation of the left shifter unit of the shifter 1 is performed. After the OR/buffer circuit 20 completes an OR operation or a buffering operation, the zero determination signal ZD is finally generated.

In the case where the shifter 1 functions as a right shifter, on the other hand, the zero determination signal generating circuit 2 of present invention performs an OR operation on or buffers predetermined bits in the 32-bit data outputted from right shifters having a shift amount of 0 among the right shifters 8 to 12, at the same time as a shifting operation of the right shifter unit of the shifter 1 is performed. After the OR/buffer circuit 26 completes an OR operation or a buffering operation, the zero determination signal ZD is finally generated.

In short, since the zero determination signal generating circuit 2 of the present invention can generates the zero determination signal ZD at the same time as the shifting operation in the shifter 1, a high-speed zero determining operation can be performed for the output data DO[31:0] of the shifter 1.

It should be understood that the OR circuit 15 may perform an OR operation on the data [16:1] before it is inputted into the left shifter 3. Likewise, the OR circuit 16 may perform an OR operation on the data [24:17] before it is inputted into the left shifter 4, the OR circuit 17 may perform an OR operation on the data [28:25] before it is inputted into the left shifter 5, the OR circuit 18 may perform an OR operation on the data [30:29] before it is inputted into the left shifter 6, and the buffer circuit 19 may buffer the data [31] before it is inputted into the left shifter 7.

Also, the OR circuit 21 may perform an OR operation on the data [30:15] before it is inputted into the right shifter 8, the OR circuit 22 may perform an OR operation on the data [14:7] before it is inputted into the right shifter 9, the OR circuit 23 may perform an OR operation on the data [6:3] before it is inputted into the right shifter 10, the OR circuit 24 may perform an OR operation on the data [2:1] before it is inputted into the right shifter 11, and the buffer circuit 25 may perform an OR operation on the data [0] before it is inputted into the right shifter 12.

FIGS. 16A to 16D show the OR circuits 15 to 18 (also shown in FIG. 1) used in the zero determination signal generating circuit of the present invention.

The OR circuit 18 shown in FIG. 16A comprises a NOR gate 18a and a NOT gate 18b. The OR circuit 17 shown in FIG. 16B comprises two NOR gates 17a and a NAND gate 17b. The OR circuit 16 shown in FIG. 16C comprises three NOR gates 16a and a NAND gate 16b. The OR circuit 15 shown in FIG. 16D comprises six NOR gates 15a receiving 16 inputs in total, two NAND gates 15b, a NOR gate 15c receiving the outputs from the NAND gates 15b, and a NOT gate 15d receiving the output from the NOR gate 15C.

In the above description of the present invention, the shifter 1 comprises the left shifter unit made up of the left shifters 3 to 7 and the right shifter unit made up of the right shifters 8 to 12. However, the OR circuits 21 to 24, the buffer circuit 25, and the selector 27 may be omitted. In such a case, the shifter 1 functions only as a left shifter. Alternatively, the OR circuits 15 to 18, the buffer circuit 19, and the selector 27 may be omitted. In such a case, the shifter 1 functions only as a right shifter.

The present invention is not limited to the specifically disclosed embodiments, but variations and modifications may be made without departing from the scope of the present invention.

The present application is based on Japanese priority application No. 11-085026, filed on Mar. 29, 1999, the entire contents of which are hereby incorporated by reference.

What is claimed is:

1. A zero determination signal generating circuit which generates a zero determination signal for determining whether output data of a shifter is zero, the shifter having first to xth left shifters cascaded where x is an integer of 3 or larger, an ith left shifter which is one of the first to xth left shifters having a $2^x$-bit structure and a shift amount of $2^{x-i}$ bits or 0 bit, $2^x$-bit input data being applied to the first left shifter and $2^x$-bit output data being outputted from the xth left shifter, said zero determination signal generating circuit comprising:

j OR circuits where j=1, 2, . . . , x−1, a kth OR circuit which is one of the j OR circuits corresponding to the kth left shifter and performing an OR operation on bits of the $2^x$-bit data inputted to or outputted from the kth left shifter and located between a digit of the $(2^x - 2^{x-k})$th power of 2 and a digit of the $(2^x - 2 \cdot 2^{x-k} + 1)$th power of 2; and an OR/buffer circuit which performs, when the shift amount is 0 to 30, an OR operation on an output of a first one of the j OR circuits corresponding to one of the left shifters having a shift amount of zero, a bit of the $2^x$-bit data located at a digit of the $(2^x - 1)$th power of 2 and outputted from the xth left shifter when not performing a shifting operation, and a bit of the $2^x$-bit input data at a digit of $2^o$, and which performs, when the shift amount is 31, a buffering operation on the bit of the $2^x$-bit input data at a digit of $2^o$, the OR/buffer circuit outputting the zero determination signal.

2. A zero determination signal generating circuit which generates a zero determination signal for determining whether output data of a shifter is zero, the shifter having first to xth right shifters cascaded where x is an integer of 3 or larger, an ith right shifter which is one of the first to xth right shifters having a $2^x$-bit structure and a shift amount of $2^{x-i}$ bits or 0 bit, $2^x$-bit input data being applied to the first right shifter and $2^x$-bit output data being outputted from the xth right shifter, said zero determination signal generating circuit comprising:

j OR circuits where j=1, 2, . . . , x−1, a kth OR circuit which is one of the j OR circuits corresponding to the kth right shifter and performing an OR operation on bits of the $2^x$-bit data inputted to or outputted from the kth right shifter and located between a digit of the $(2^{x-(i-1)} - 2)$th power of 2 and a digit of the $(2^{x-i} - 1)$th power of 2; and an OR/buffer circuit which performs, when the shift amount is 0 to 30, an OR operation on an output of a first one of the j OR circuits corresponding to one of the right shifters having a shift amount of zero, a bit of the $2^x$-bit data located at a digit of the $2^o$ and outputted from the xth right shifter when not performing a shifting operation, and a bit of the $2^x$-bit input data at a digit of the $(2^x - 1)$th power of 2, and which performs, when the shift amount is 31, a buffering operation on the bit of the $2^x$-bit input data at a digit of the $(2^x - 1)$th power of 2, the OR/buffer circuit outputting the zero determination signal.

3. A zero determination signal generating circuit which generates a zero determination signal for determining whether output data of a shifter is zero, the shifter having a left shifter unit, a right shifter unit, and an output data selector, the left shifter unit having first to xth left shifters cascaded where x is an integer of 3 or larger, an ith left shifter which is one of the first to xth left shifters having a $2^x$-bit structure and a shift amount of $2^{x-i}$ bits or 0 bit, $2^x$-bit input data being applied to the first left shifter and $2^x$-bit output data being outputted from the xth left shifter, the right shifter unit having first to xth right shifters cascaded where x is an integer of 3 or larger, an ith right shifter which is one of the first to xth right shifters having a $2^x$-bit structure and a shift amount of $2^{x-i}$ bits or 0 bit, $2^x$-bit input data being applied to the first right shifter and $2^x$-bit output data being outputted from the xth right shifter, the output data selector which selects and outputs the output data of the left shifter unit when the shifter functions as a left shifter, and which selects and outputs the output data of the right shifter unit when the shifter functions as a right shifter, said zero determination signal generating circuit comprising:

j left-shifter OR circuits where j=1, 2, . . . , x–1, a kth left-shifter OR circuit which is one of the j left-shifter OR circuits corresponding to the kth left shifter and performing an OR operation on bits of the $2^x$-bit data inputted to or outputted from the kth left shifter and located between a digit of the $(2^x-2^{x-k})$th power of 2 and a digit of the $(2^x-2 \cdot 2^{x-k}+1)$th power of 2;

a left-shifter OR/buffer circuit which performs, when the shift amount is 0 to 30, an OR operation on an output of a first one of the j left-shifter OR circuits corresponding to one of the left shifters having a shift amount of zero, a bit of the $2^x$-bit data located at a digit of the $(2^x-1)$th power of 2 and outputted from the xth left shifter when not performing a shifting operation, and a bit of the $2^x$-bit input data at a digit of $2^0$, and which performs, when the shift amount is 31, a buffering operation on the bit of the $2^x$-bit input data at a digit of $2^o$:

j right-shifter OR circuits where j=1, 2, , x–1, a kth right-shifter OR circuit which is one of the j right-shifter OR circuits corresponding to the kth right shifter and performing an OR operation on bits of the $2^x$-bit data inputted to or outputted from the kth right shifter and located between a digit of the $(2^{x-(i-1)}-2)$th power of 2 and a digit of the $(2^{x-i}-1)$th power of 2;

a right-shifter OR/buffer circuit which performs, when the shift amount is 0 to 30, an OR operation on an output of a first one of the j right-shifter OR circuits corresponding to one of the right shifters having a shift amount of zero, a bit of the $2^x$-bit data located at a digit of the 20 and outputted from the xth right shifter when not performing a shifting operation, and a bit of the $2^x$-bit input data at a digit of the $(2^x-1)$th power of 2, and which performs, when the shift amount is 31, a buffering operation on the bit of the $2^x$-bit input data at a digit of the $(2^x-1)$th power of 2; and a zero determination signal selector which selects and outputs an output of the left-shifter OR/buffer circuit as the zero determination signal when the shifter functions as a left shifter, and which selects and outputs an output of the right-shifter OR/buffer circuit as the zero determination signal when the shifter functions as a right shifter.

\* \* \* \* \*